United States Patent [19]

Kopetz et al.

[11] 3,883,481

[45] May 13, 1975

[54] FIRE-RETARDANT POLYOLEFIN COMPOSITIONS

[75] Inventors: Kurt Kopetz; Willi Ziegenbein; Anton Schick, all of Marl, Germany

[73] Assignee: Chemische Werke Huels Aktiengesellschaft, Marl, Germany

[22] Filed: July 27, 1973

[21] Appl. No.: 383,272

Related U.S. Application Data

[63] Continuation of Ser. No. 92,943, Nov. 25, 1970, abandoned, and a continuation-in-part of Ser. No. 677,062, Oct. 23, 1967, abandoned.

[30] Foreign Application Priority Data

Oct. 28, 1966 Germany................................ 40545

[52] U.S. Cl. 260/45.75 B; 260/45.85 R; 260/45.7 R; 260/45.95 G; 260/479 S; 260/612 R; 260/890
[51] Int. Cl. ............................................. C08f 45/58
[58] Field of Search. 260/45.7 R, 45.85 R, 45.95 G, 260/479 S, 612 R

[56] References Cited
UNITED STATES PATENTS

| | | | |
|---|---|---|---|
| 2,676,946 | 4/1954 | McCurdy | 260/45.75 |
| 3,075,944 | 1/1963 | Wick et al. | 260/45.75 |
| 3,210,315 | 10/1965 | Blackburn et al. | 260/45.85 |
| 3,275,578 | 9/1966 | Pedjac | 260/2.5 |
| 3,372,141 | 3/1968 | Dickerson et al. | 260/45.95 |
| 3,419,518 | 12/1968 | Mahling | 260/45.75 |
| 3,658,634 | 4/1972 | Yanagi et al. | 260/45.7 |
| 3,660,351 | 5/1972 | Schmidt et al. | 260/45.85 |
| 3,728,304 | 4/1973 | Hirao | 260/45.75 |
| 3,808,171 | 4/1974 | Mohajer | 260/45.75 |
| 3,830,766 | 8/1974 | Praetzel et al. | 260/45.75 |

*Primary Examiner*—V. P. Hoke
*Attorney, Agent, or Firm*—Millen, Raptes & White

[57] ABSTRACT

Flame retardants for polyolefins comprising a mixture of (a) 2–20 percent of brominated organic compounds and (b) 2–9 percent antimony trioxide by weight based on the polyolefin, the brominated organic compounds containing aliphatically as well as aromatically bound bromine atoms in the same molecule, such as β-bromoethyl-4-bromobenzene.

6 Claims, No Drawings

FIRE-RETARDANT POLYOLEFIN COMPOSITIONS

CROSS REFERENCE TO RELATED APPLICATION

This application is a continuation-in-part of application Ser. No. 677,062, filed Oct. 23, 1967, and claims the same priority of German Application C 40,545 IVc/39 b, filed Oct. 28, 1966. This is a continuation of application Ser. No. 92,943, filed Nov. 25, 1970 now abandoned and 677,062, filed Oct. 23, 1967 now abandoned.

BACKGROUND OF THE INVENTION

This invention relates to fire-retardant compositions, and in particular to such compositions based on a mixture of (a) a brominated organic compound and (b) antimony trioxide, said mixture being particularly useful for imparting noncombustibility to polyolefins.

Because of their combustion properties, ordinary polyolefins, such as polyethylene, polypropylene, polyisobutylene, etc., cannot be universally employed in the construction and other fields wherein strict underwriters' standards prevail. As a consequence thereof, several flame retardants as well as combustion tests have been proposed to attempt to remove the inadequacy of polyolefins.

With respect to combustion tests, rectangular plate-shaped materials are tested (1) for flameproof properties and (2) for self-extinguishing together with flammability properties. Such tests are intended to reflect actual fire conditions, and are conducted according to two methods:

1. DIN (German Industry Standard) 4102, Sheet 1

Four plates of 1,000 × 190 × 3 mm clamped in a vertical position, and at right angles to each other to resemble the shape of a stack having a square cross section (190 × 190 mm) are hung in a vertical kiln. Air is supplied from below through a perforated bottom. The flames of about 250–300 mm in height are produced by an annular burner having 36 nozzle openings, the flames impinging upon the interior sides of the plates. For a rating of flame-proof, the fire must be self-extinguishing substantially at once after 11 minutes of flame treatment. In addition, at least 15 percent of the plate area must be uneffected.

2. Test according to ASTM Designation D 635 — 56 T.

A test sample 127 × 12.7 × 3 mm is tightly clamped and then bent to an angle of 45° of the horizontal axis. A Bunsen burner (diameter about 5 mm) is used to shoot flames of a height of about 12 – 13 mm so that the tip of the flame reaches the end of the test sample. If after a flame time of 2 × 30 seconds, the sample does not burn any further, the classification is "nonburning by this test". If the material exhibits afterburning, but without exceeding the 4 inch mark, such material is designated as "self-extinguishing by this test". If the material continues burning, then it is classified as "burning by this test".

In the DIN test, combustion conditions occur corresponding to a raging fire, i.e., very high temperatures fortified by the chimney configuration and heat of combustion of the test samples. Under such conditions, there can be used only those additives effective at relatively high temperatures.

In contrast, in the ASTM test method, a relatively small flame is employed; likewise, the mass and thus the energy capacity of the test samples is also small. Under such conditions, it is possible that some additives having a relatively high temperature decomposition range, cannot become sufficiently effective. This is so because the combustion temperature of the plastic test sample is below the temperature at which said additives are most useful.

With respect to already known fire-retardant compositions, chlorinated paraffins in combination with antimony trioxide has been suggested for polyolefins, (Hans Vogel, Flammfestmachen von Kunststoffen [Making Synthetic Materials Flameproof], page 46, Huthig Publishers). However, with such additives it is impossible to obtain polyolefins having satisfactory flame-proof properties, unless the additives are added in comparatively great amounts (over 20 percent), and such great amounts result in unacceptable mechanical properties of the final product. In addition, perhaps the greatest disadvantage of the chlorinated paraffins is that hydrogen chloride splits off at relatively low temperatures, causing corrosion of the processing machines and molds. Ordinarily, stabilizers can be added to prevent HCl liberation, but with such high proportions of chlorinated paraffins in the mixture, even the addition of very effective acid acceptors does not solve the problem.

With respect to another type of fire-retardant, aliphatic bromine compounds, already suggested for use with polystyrene (DAS's [German Published Applications] 1,090,851 and 1,090,852) cannot be employed in polyolefins for the following reasons:

a. the decomposition temperatures of aliphatic bromine compounds commence far below the processing temperatures necessary for the polyolefins; and b. this class of compounds exhibits, in polyolefins, little or no fire-retardant effectiveness.

On the other hand, nuclear-brominated aromatic compounds, as described, for example, in German Patents 1,103,020; 1,123,823; 1,127,582; and 1,135,653 are generally effective and those difficulties associated with the use of chlorinated paraffins are avoided. In particular, the nuclear-brominated aromatic compounds can satisfy the flammability requirements of the DIN-4102 test in contradistinction to aliphatic chlorine compounds which are completely ineffective under the same conditions because of their low decomposition temperatures, and the inability of stabilizers to make any significant change in this over-all picture. It is to be noted, however, that the nuclear-brominated aromatic compounds, per se, are unsatisfactory when used in the ASTM test.

Thus, to provide an additive effective under all combustion conditions occurring in practice, i.e., satisfying both test methods to the same degree, there was proposed a combination of nuclear-brominated aromatic compounds with chlorinated paraffins, in accordance with German Patent Application C 30, 334 IVc/39b. Although these mixtures were satisfactory fire retardants, very close and accurate temperature control must be maintained during the processing step to avoid HCl liberation. This requirement that the process must be monitored to a certain extent is a drawback which detracts from the industrial acceptance of such mixtures.

SUMMARY OF THE INVENTION

An object of this invention is to provide novel chemical compositions.

Another object is to provide fire-retardant compositions which on the one hand satisfy combustion conditions, and on the other hand do not necessitate the use of temperature-monitoring during the processing steps.

Upon further study of the specifications and claims, other objects and advantages of the present invention will become apparent.

To attain the objects of this invention the material to be fireproofed is provided with (a) 2–20 percent by weight of a compound containing, in the same molecule, aromatically bound bromine, as well as aliphatically bound bromine, and (b) 2–9 percent by weight of antimony trioxide, based on said material, respectively.

DETAILED DISCUSSION OF THE INVENTION

This invention is particularly applicable to polyolefins, for example, polyethylenes, polypropylenes, polybutenes, and higher polyolefins, i.e., polymers consisting essentially of carbon and hydrogen, with polydiolefins being included, e.g., polyisoprene, polybutadiene, and higher homologs. On the other hand, the combination of antimony trioxide and the organic bromine compound will impart fire-retardant properties to all normally combustible organic materials, and will, no doubt, be especially useful for materials not as yet even invented, but which have relatively high processing temperatures as the polyolefins.

Suitable brominated compounds containing aromatically as well as aliphatically bound bromine in the molecule, are:

a. mixed aromatic-aliphatic ethers wherein the nucleus as well as the aliphatic chain contain bromine, and wherein the bromine content is between 30 and 85 percent, preferably between 50 and 80 percent, and wherein the brominated aliphatic chain is "open", that means, no brominated aliphatic chain is located between two nucleus, but only attached to one nucleus.

Preferred embodiments include, but are not limited to:

2,4,6-tribromophenyl-β,γ-dibromobutylether;
2,4,6-tribromophenyl-β,γ-dibromopropylether;
2,4,6-tribromophenyl-α,β-dibromoethylether;
2,2'-bis[4(β,γ-dibromopropoxy)-3,5-dibromophenyl]-propane;
2,2'-bis-[4(β,γ-dibromobutoxy)-3,5-dibromophenyl]-propane;
2,2'-bis-[4(α,β-dibromoethoxy)-3,5-dibromophenyl]-methane;

the second listed compound being particularly effective with polypropylene, and the fourth listed compound being effective with polybutene;

b. mixed aromatic-aliphatic esters wherein the nucleus as well as the aliphatic chain contain bromine, and the bromine content is between 30 and 85 percent, preferably between 50 and 80 percent, particularly those esters produced from a hydroxyl-containing aromatic compound of about 6–12 carbon atoms and an aliphatic monocarboxylic acid of 2–9 carbon atoms, e.g., 2,4,6-tribromophenyl-β,γ-dibromobutyric acid ester;
α,β-dibromobutyric acid-2,4,6-tribromophenyl ester;
2,2'-bis[4-(β,γ-dibromobutyric acid ester)-3,5-dibromophenyl]-propane;
2,2'-bis[(α4α,β-dibromopropionic acid ester)-3,5-dibromophenyl]-ethane;

c. alkyl aromatic compounds wherein the nucleus as well as the aliphatic chain contain bromine, and the bromine content is between 30 and 85 percent, preferably between 50 and 80 percent, and wherein the brominated aliphatic chain is "open", that means, no brominated aliphatic chain is located between two nucleus, but only attached to one nucleus.

The preferred embodiments include, but are not limited to: α,β-dibromoethyl-2,4,6-tribromobenzene, β,γ-dibromopropyl-tribromobenzene, α-bromotribromotoluene, α-bromoethyl-tribromobenzene, and 2,2'-bis[4-(β,γ-dibrombutane)-3,5-dibromphenyl]-propane.

In general, the aliphatic portion of the molecule contains 1 to 13, preferably 2 to 9 carbon atoms, and the aryl portion 6 to 12 carbon atoms.

The mixed ethers and esters which are brominated aliphatically as well as aromatically are obtained by brominating, for example, unsaturated ethers or esters produced by alkylation, vinylation, or allylation, or by reacting the brominated phenols with acid chlorides, in a conventional manner.

The brominated alkyl aromatics are obtained by conventionally alkylating, for example, according to Friedel-Crafts, an aromatic compound, such as benzene, with alkyl halides, alcohols or olefines, and then brominating the resultant hydrocarbon at elevated temperature under the effect of actinic light first in the side chain, and thereafter at a lower temperature in the presence of a catalyst in the nucleus, this sequence being also reversible. A further possibility resides in alkylating the aromatic compound with alkenyl halides, and then reacting the unsaturated side chain with bromine or hydrogen bromide at a lower temperature, followed by the catalytic nuclear bromination.

Specific alkyl aromatic compounds are obtained by brominating, for example, previously brominated styrenes, such as 2,4,6-tribromostyrene or 4-bromostyrene in the vinyl chain.

It is preferred to distribute the bromine content in approximately equal portions, e.g., 10 to 70 percent, especially 20 to 60 percent to the nucleus and the aliphatic group. However, some fire retardancy is obtained if at least one bromine atom is bound to one of these groups. Since the ethers and esters, if desired, can be produced by the condensation of two pre-brominated, pure and specific individual components, it is possible to employ chemically specifically defined compounds having a known and unitary bromine distribution. In contrast thereto, in the case of brominated alkyl aromatics, if produced by brominating a bromine-free alkyl or alkenyl aromatic compound, there will be produced mostly mixtures of compounds brominated to different degrees and at different places.

Important brominated compounds of this invention include, but are not limited to:

2,4,6-Tribromophenyl-β-γ-dibromobutylether;
2,4,6-Tribromophenyl-α,β-dibromoethylether;
2,2'-Bis[4(β,γ-dibromopropoxy)-3,5-dibromophenyl]-propane;
2,2'-Bis-[4(β,γ-dibromobutoxy)-3,5-dibromophenyl]-propane;
2,4,6-Tribromophenyl-β,γ-dibromobutyric acid ester;
α,β-Dibromobutyric acid-2,4,6-tribromophenylester;
2,2'-Bis[4-(β,γ-dibromobutyric acid ester)-3,5-dibromophenyl-]-propane;
α,β-Dibromoethyl-2,4,6-tribromobenzene;
α,γ-dibromopropyl-2,4,6-tribromobenzene.

The antimony trioxide is employed in amounts of from 2 to 8, preferably 2 to 5 percent, and the brominated compound is 2–20 percent, preferably 2 to 10, by weight, based on the polyolefin.

The individual components are admixed to the base material, e.g., polyolefins in optional succession, or simultaneously, and blended in a conventional manner with other additives such as fillers, pigments, stabilizers, etc. The thus-obtained mixtures are shaped by conventional methods, e.g., molding.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever. Table I, as follows, sets forth self-explanatory examples:

COMPARATIVE EXAMPLES 6-13

The following compositions were subjected to the same tests according to DIN 4102, and according to ASTM D 635 — T 56:

a. 100 parts by weight of polypropylene 5 parts by weight of bromine compound 2 parts by weight of antimony trioxide b. 100 parts by weight of polybutene-1 5 parts by weight of bromine compound 2 parts by weight of antimony trioxide The bromine compounds were:

I. 2,4,6-Tribomophenyl-α,γ-dibromopropyl ether

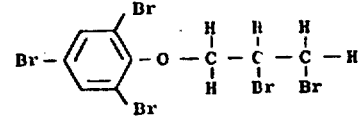

TABLE I

| Examples | Recipe | Plate Test DIN 4102 | Test According to ASTM D 635 - T 56 | Remarks |
| --- | --- | --- | --- | --- |
| 1 | 100 parts by weight of polypropylene (molecular weight ca. 300,000)<br>6 parts by weight of 2,4,6-tribromo-phenyl-α,β-dibromoethylether<br>4 parts by weight of antimony trioxide | passed | Nonburning | Drippings of material do not continue to burn on the floor |
| 2 | 100 parts by weight of polypropylene (Molecular weight ca. 300,000)<br>5 parts by weight of 2,2'-bis-[β,γ-dibromo-butyric acid ester-3,5-dibromophenyl]-propane<br>5 parts by weight of antimony trioxide | passed | Nonburning | Drippings of material do not continue to burn on the floor |
| 3 | 100 parts by weight of polybutene-(1) (molecular weight ca. 2,000,000)<br>5 parts by weight of 2,2'-bis-[4-(β,γ-dibromo-propoxy)-3,5-dibromophenyl]-propane<br>4 parts by weight of antimony trioxide | passed | Nonburning | Drippings of material do not continue to burn on the floor |
| 4 | 100 parts by weight of polybutene-(1) (Molecular weight ca. 2,000,000)<br>7 parts by weight of 2,4,6-tribromophenyl-β-γ-dibromobutyric acid ester<br>4 parts by weight of antimony trioxide | passed | Nonburning | Drippings of material do not continue to burn on the floor |
| 5 | 100 parts by weight of polyethylene (molecular weight ca. 50,000)<br>8 parts by weight of 2,2'-bis-[4-(β,γ-dibromo-butyric acid ester)-3,5-dibromophenyl]-propane<br>5 parts by weight of antimony trioxide | passed | Nonburning | Drippings of material do not continue to burn on the floor |

The particular advantages achieved by the present invention reside not only in obtaining less temperature-sensitive mixtures, which can be thermoplastically shaped without any special precautions under the conventional processing conditions, e.g. temperatures of 200° to 240° C.; but also the total amount of fire-retardant additives, as compared to prior practice, can be lowered, obtaining the identical effect. Thus, with additives totalling even below 10 percent of the entire amount of the mixture, an excellent flameproof effect can be attained, and no discolorations occur in the mixtures mentioned in the examples, even at a processing temperature of 240° C.

The preceding examples can be repeated with similar success by substituting the generically and specifically described reactants and operating conditions of this invention for those used in the preceding examples.

II. 2,2'-Bis[4-(β,γ-dibromopropoxy)-3,5-dibromophenyl]-propane

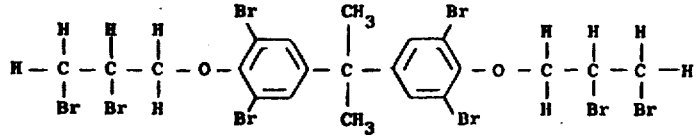

III. 1,4-Bis-2,4,6-tribromophenoxy-2,3-dibromobutane

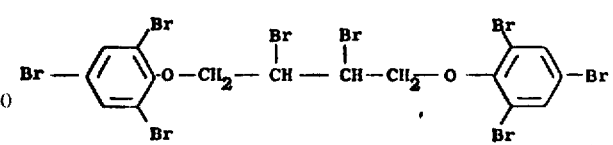

IV. Bis-2,4,6-tribromophenyl ester of 2,3-dibromosuccinic acid

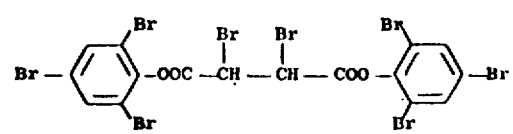

V. 2,4,6,2',4',6',α,α'-Octabromodibenzyl

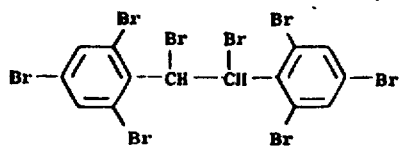

Whereas I and II are compounds employed in accordance with this invention, compounds III, IV and V are compounds which could be derived from DAS 1,135,653. The results are self-explanatory and are set forth in Table II, as follows:

TABLE II

| Examples | Recipe | Test on the Plate According to DIN 4102 | Test According to ASTM D 635-T 56 | Remarks |
| --- | --- | --- | --- | --- |
| 6 | a + I | Passed | Nonburning | Dripped-down material does not continue burning on the floor [ground] |
| 7 | a + III | Failed | Self-extinguishing | do. |
| 8 | a + IV | Failed | Burns | Dripped-down material continues burning on floor |
| 9 | a + V | Failed | Burns | do. |
| 10 | b + II | Passed | Nonburning | Dripped-down material does not continue burning on the floor |
| 11 | b + III | Failed | Self-extinguishing | do. |
| 12 | b + IV | Failed | Burns | Dripped-down material continues burning on floor |
| 13 | b + V | Failed | Burns | do. |

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A flame-resistant polyolefin composition comprising on a weight basis 100 parts of a polyolefin, 2–9 parts antimony oxide, and 2–20 parts of

[structure: two brominated phenyl rings each bearing OR$_2$, connected through a central C bearing two R$_1$ groups]

wherein $R_1$ is H or $CH_3$ and $R_2$ is dibromoethyl, dibromopropyl or dibromobutyl.

2. A composition as defined by claim 1, wherein said compound is 2,2'-bis[4(β,γ-dibromopropoxy)-3,5-dibromophenyl]-propane;

2,2'-bis-[4(β,γ-dibromobutoxy)-3,5-dibromophenyl]-propane; or

-bis-[4(α,β-dibromoethoxy)-3,5-dibromophenyl]-methane.

3. A composition as defined by claim 1 wherein said organic compound is 2,2'-bis[4-(β,γ-dibromopropoxy)-3,5-dibromophenyl]-propane.

4. A flame-resistant composition as defined by Claim 1 wherein the polyolefin is polypropylene.

5. A flame-resistant composition as defined by Claim 1, wherein the polyolefin is polybutene.

6. A flame-resistant polyolefin composition comprising on a weight basis 100 parts of a polyolefin, 2–9 parts antimony oxide, and 2–20 parts of a compound selected from the group consisting of:

2,2'-bis-[4-(β,γ-dibromobutyric acid ester)-3,5-dibromophenyl]-propane; and 2,2'-bis[4-(α,β-dibromopropionic acid ester)-3,5-dibromophenyl]-ethane.

* * * * *